June 2, 1953  E. O. DALE  2,640,725
STANDARDIZED DUMP BODY ASSEMBLY
Filed Feb. 23, 1949  4 Sheets-Sheet 1
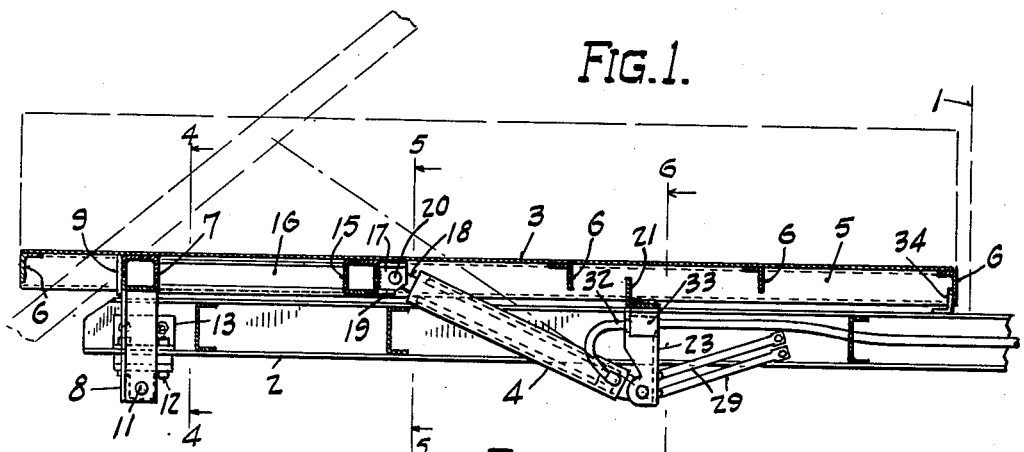
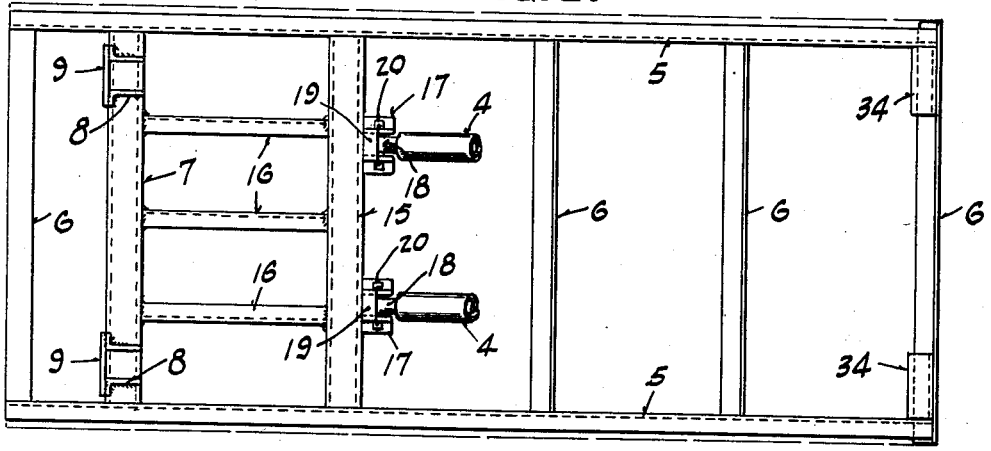
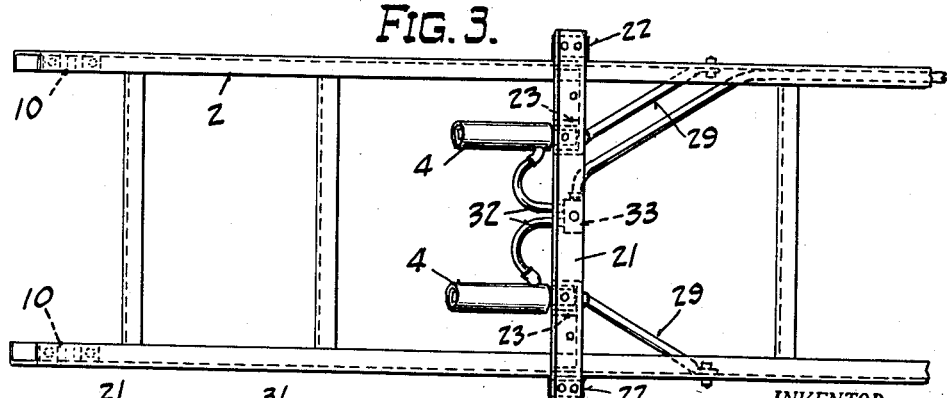
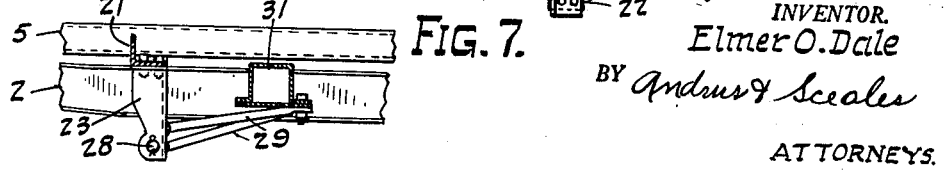
INVENTOR.
Elmer O. Dale
BY Andrus & Sceales
ATTORNEYS.

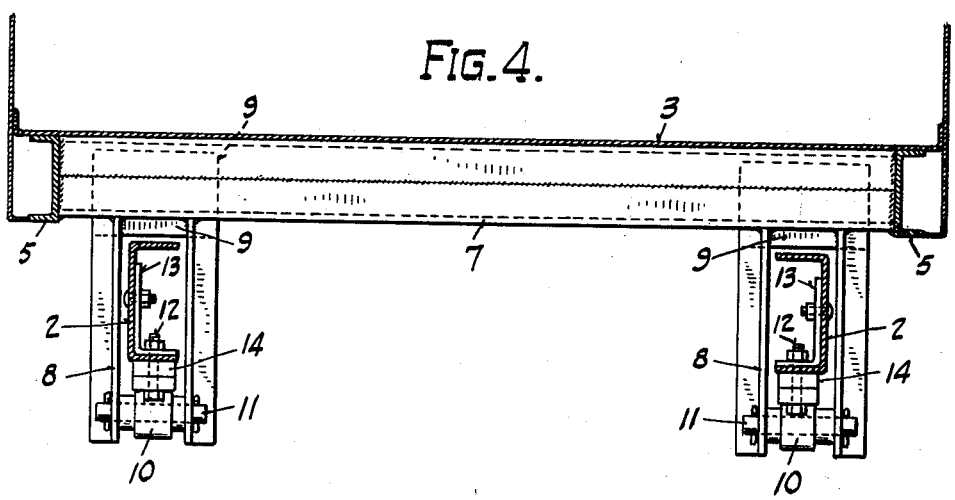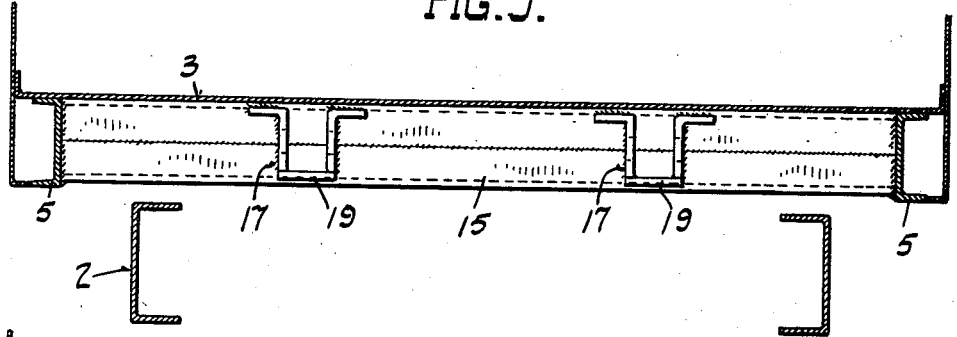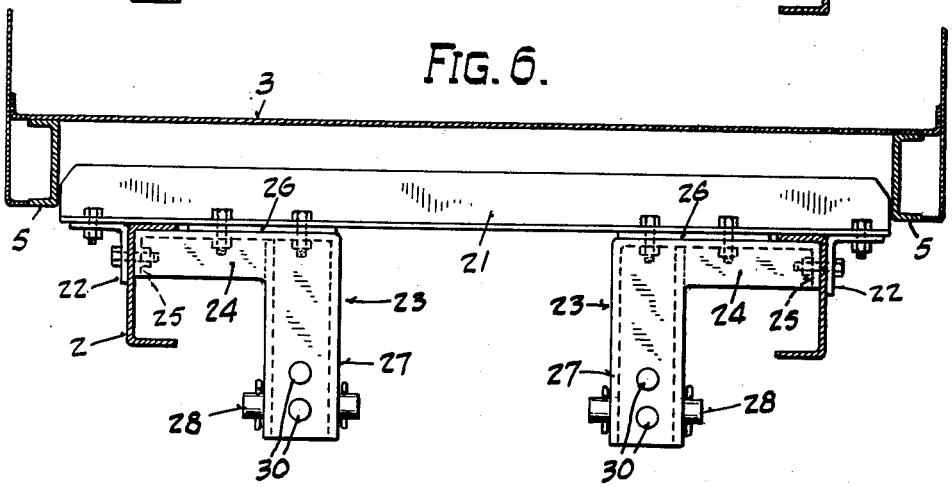

June 2, 1953  E. O. DALE  2,640,725
STANDARDIZED DUMP BODY ASSEMBLY
Filed Feb. 23, 1949  4 Sheets-Sheet 3
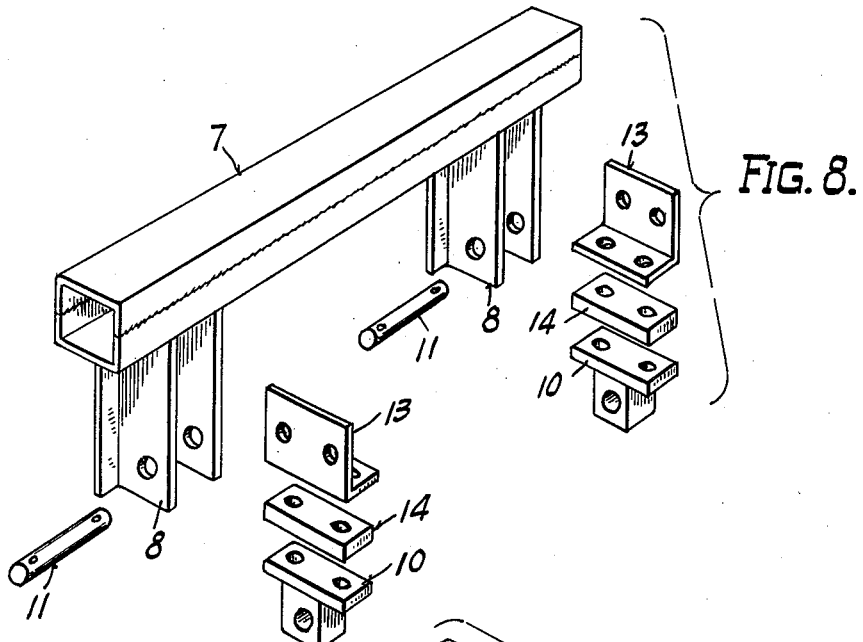
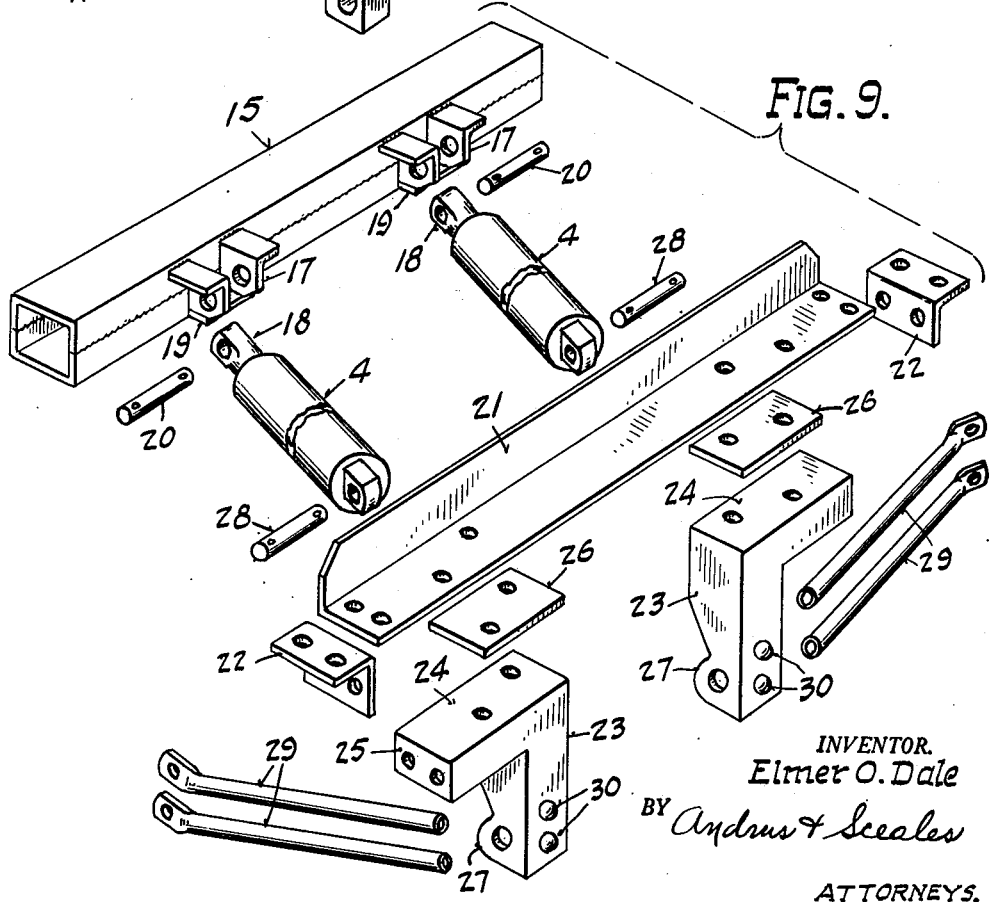
INVENTOR.
Elmer O. Dale
BY Andrus + Scales
ATTORNEYS.

June 2, 1953 E. O. DALE 2,640,725
STANDARDIZED DUMP BODY ASSEMBLY
Filed Feb. 23, 1949 4 Sheets-Sheet 4
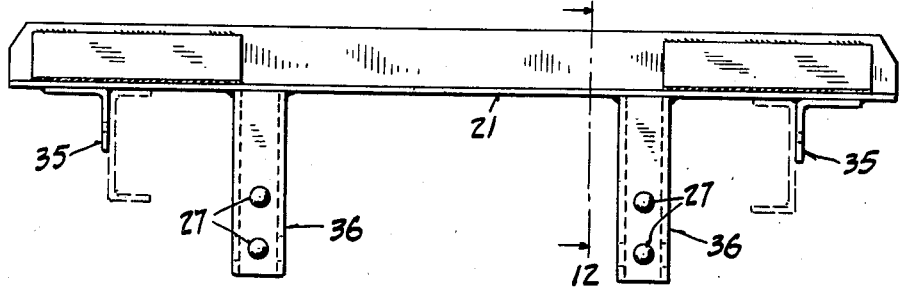
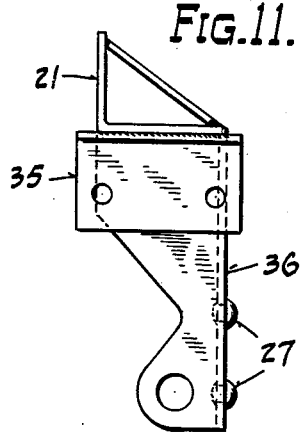
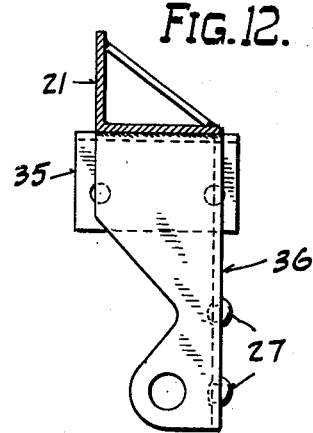
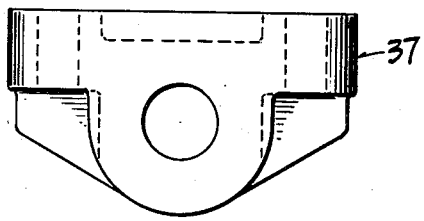
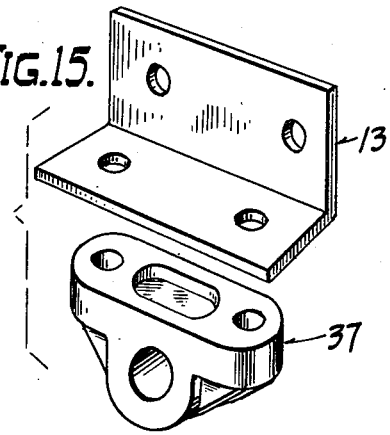
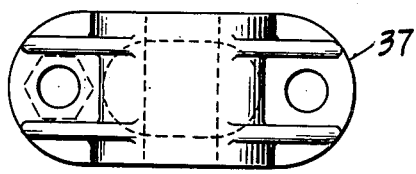
INVENTOR.
Elmer O. Dale
BY Andrus & Sceales
ATTORNEYS.

Patented June 2, 1953

2,640,725

UNITED STATES PATENT OFFICE 2,640,725

STANDARDIZED DUMP BODY ASSEMBLY

Elmer O. Dale, Waukesha, Wis., assignor, by mesne assignments, to Gar Wood Industries, Incorporated, a corporation of Michigan Application February 23, 1949, Serial No. 77,759

9 Claims. (Cl. 298—22)

This invention relates to a standardized dump body assembly and particularly has reference to an assembly for providing a dump body on a truck chassis.

One object of the invention is to provide standard parts adapted to be used for converting a pick-up truck of the box or platform type into a dump truck.

Another object of the invention is to provide standard parts for truck chassis of many different types and models for assembling a dump body on such chassis.

Another object of the invention is to provide standard parts for converting pick-up trucks into dump trucks or for assembling a dump body on a truck chassis, which parts can be assembled without requiring the services of a skilled mechanic.

Another object of the invention is to provide a dump truck in which the usual sub-frame is eliminated.

A further object is to provide standard parts to be used in converting a pick-up type of truck into a dump truck or for assembling a dump body on a truck chassis at a substantially lesser cost.

A further object is to provide standard parts for making a dump truck wherein the dump box is located at a minimum height above the frame level.

These and other objects of the invention will appear hereinafter in connection with the following description of the drawings illustrating the invention.

In the drawings:

Figure 1 is a longitudinal section through a truck frame showing the parts of the invention assembled therewith;

Fig. 2 is a bottom plan view of a truck box showing the parts assembled therewith which are secured to the box;

Fig. 3 is a top plan view of the frame of the truck to which the invention is applied with the parts of the invention assembled with the frame secured thereto;

Fig. 4 is a section taken on line 4—4 of Fig. 1;

Fig. 5 is a section taken on line 5—5 of Fig. 1;

Fig. 6 is a section taken on line 6—6 of Fig. 1;

Fig. 7 is a detailed section of a modified form of the invention showing braces for the lower ram brackets attached to a cross member of the truck;

Fig. 8 is an exploded perspective view of the hinge elements;

Fig. 9 is an exploded perspective view of the ram assembly;

Fig. 10 is a front elevation of the channel member illustrating another embodiment of the invention;

Fig. 11 is an end view looking from the left in Fig. 10;

Fig. 12 is a section taken on line 12—12 of Fig. 11;

Fig. 13 is a side elevation of a block in the upper portion of the assembly supporting the rams and illustrating another embodiment of the invention;

Fig. 14 is a bottom plan view of the block of Fig. 13; and

Fig. 15 is a perspective view of the block.

The invention is directed to the supplying of standardized parts which may be employed to convert the box or platform type pick-up truck into a dump truck or which may be utilized with a truck chassis to assemble a dump body thereon.

For purposes of illustration the drawings show a box type pick-up truck which has been converted into a dump truck. Referring to the drawings there is shown a portion of a cab 1 of the truck converted under the invention, supported on a chassis of which only the frame 2 is shown and on which is assembled the dump box 3.

In general, the members provided to support the standardized parts which are secured to the box 3 for supporting the upper ends of the rams 4 for tilting the box upwardly, as shown in dotted lines in Fig. 1, to dump materials contained therein, comprise a pair of longitudinally extending side members 5 braced by the cross members 6 spaced apart, as shown, and which are welded to the side members 5. Side members 5 are inset within any cross members which may be supplied on the bottom of the truck body when it is initially constructed to brace the same. The side members 5 are ordinarily welded directly to the sides of the box 3 as the sides are usually of metal and they may be welded to the bottom of the box when the latter is of metal.

In order to support the parts for hinging box 3 to the frame 2 of the truck, a squarely shaped hollow metal frame 7 is provided across the box 3 spaced slightly inwardly from rear cross member 6, and is welded to side frame members 5.

The box hinges 8 are welded to frame 7 near the opposite ends of the frame. Each box hinge comprises a pair of depending flanged legs 38 and 39 which are spaced apart to clear truck frame 2 and extend downwardly below the truck frame for a substantial distance. A flat plate 9 is welded to the upper end portion of the flanged side of each hinge 8 and to the frame 7 to secure each hinge to the frame 3.

The block 10 of each hinge 8 is formed of a depending portion extending from a flat overhanging body portion. The hinge pin 11 extends transversely through aligned bearing holes near the bottom of the legs of each hinge 8 and through the depending portion of block 10 to pivot the hinge on the block. Cotter pins hold the respective hinge pins in place.

A pair of spaced bolts 12 extend upwardly through the overhanging end portions of the body portion of block 10, through the bottom flange of truck frame 2, and the bottom flange of the angular shaped member 13 which is bolted or welded to the side of frame 2 to reinforce the assembly. A shim 14 or plurality of shims may be interposed between frame 2 and block 10 and the bolts 12 pass therethrough. Suitable nuts are threaded onto the upper end of bolts 12 to secure the assembly in place. Shims 14 provide for the use of standard hinge parts for many different makes of trucks.

A second hollow frame member 15 similar to frame 7 is provided across the bottom of box 3 forwardly of frame 7. Frame 15 is welded to the side frames 5 and may be welded to the bottom of box 3 if the box is of metal. A plurality of short longitudinal braces 16 extend between frames 7 and 15 and are welded thereto to brace the same.

Spaced brackets 17 are welded to frame 15 to receive the upper ends 18 of the rams 4. Brackets 17 each comprises a pair of spaced leg members flanged outwardly at the top for welding the same to the forward side of frame 15. A bottom plate 19 on each bracket underlies frame 15 a slight distance for welding thereto but is removed from the outer edge of each bracket to prevent interference with the operation of ram 4.

The upper end 18 of the piston of each ram 4 is disposed between the legs of bracket 17 and a hinge pin 20 projects through aligned holes in the bracket legs and piston end 18 to pivot each ram to its respective bracket. Cotter pins hold the respective hinge pins in place.

An additional assembly is provided to pivot the lower ends of each ram 4 to frame 2 of the truck. The support for this assembly comprises a transversely extending angular shaped member 21 which, as illustrated in the drawings, overhangs the frame 2 of the truck slightly forwardly of a transverse mid-line through frame 2. The upper outer ends of member 21 are tapered to provide a guide for the longitudinal frame 5 of box 3, as shown in Fig. 9, as the box is lowered onto the truck frame.

Angle irons 22 are bolted to the outside of frame 2 and to the lower flange of member 21 where the latter overhangs frame 2.

The brackets 23 are bolted to frame 2 beneath member 21 on the inside of frame 2. Brackets 23 are of general L-shape and comprise an upper flat portion 24 which lies beneath member 21 and which receives bolts extending vertically through member 21, and a flanged end 25 which abuts against the inside of frame 2 and receives the bolts extending horizontally therethrough and through frame 2 and angle iron 22. The upper portion 24 of each bracket is of substantial length and the brackets are indexed relative to frame 2 when flange 25 is abutted against the inside of frame 2. Shims 26 are provided between brackets 23 and member 21 to make up for the truck frame thickness.

The rest of brackets 23 comprise a channeled section 27 which extends downwardly from upper portion 24. This section near the bottom receives the lower end of rams 4. The hinge pin 28 extends transversely through aligned holes in the flanges of section 27 and the lower end of each ram 4 to pivot the rams to the brackets. Cotter pins secure the respective hinge pins 28 in place.

Brackets 23 are additionally braced against the thrust of rams 4 by a single tube or as shown, a pair of tubes 29 which extend from each bracket forwardly to the frame 2 of the truck.

Each bracket is provided with hemispherical projections 30 in the forward side of section 27 thereof which projections may be provided by rivets or machined parts or as a part of the bracket. The projections provide a seat for the end of each tube in the nature of a ball and socket joint. This construction permits the tubes to be adjusted to different positions and remain seated on projections 30 for welding thereto. The forward end of tubes 29 are flattened so that they can be bolted to the frame. The tubes are made of standard length and may be cut to size to be assembled with different makes of trucks.

Fig. 7 illustrates a modified form of brace assembly for bracing brackets 23. In this assembly the cross member 31 illustrates one of the cross members of a certain make of truck. The tubes 29 are welded to projections 30 as previously described but the forward flattened ends of each tube are in turn bolted to the bottom of cross member 31. This embodiment illustrates the rotation of the tubes to a different position in which they still remain seated on projections 30.

Fig. 3 shows the hose connections 32 and T block 33 for supplying hydraulic pressure to rams 4 to lift box 3 to the tilted position shown in dotted lines in Fig. 1.

In order to support box 3 on the frame 2, as shown in Fig. 1, the flanged support members 34 are secured at the corners of the forward end of box 3.

The parts of the invention can be assembled with a truck frame and box in a number of different ways. In fact as different makes and models of trucks are worked with, standard instructions for the various makes become established.

Under one manner of assembly which is only generally described the workman measures back, say, eighty inches from the rear center of cab 1 and marks both channels of frame 2 at that distance. Each chassis hinge assembly comprising angle iron 13, shim 14 and block 10 is then secured to the frame channels with the center of the transverse hole through each block in line with the marks on the respective channels of frame 2.

Thereafter the workman measures forwardly forty-seven and one-half inches from the center of the hole in each of blocks 10 and marks both channels of frame 2 at that distance. The holes through the legs of lower ram brackets 23 are centered with respect to these marks. The respective brackets 23 and their reinforcing angle irons 22 are then bolted together and to frame 2. Then guide and support member 21 is laid over the frame, lined up with brackets 23 and bolted thereto and to angle irons 22.

Brace tubes 29 are next added after first cutting them to proper length to extend between brackets 23 and frame 2. The outer flat ends of tubes 29 are bolted to frame 2 and the inner ends are thereafter welded to rivet heads 30 on brackets 23.

The lower ends of rams 4 are then installed within the lower ram brackets 23 by inserting hinge pin 28 through aligned holes in the legs of each bracket 23 and the lower formed end of each ram 4. The brackets 23 are indexed relative to frame 2 by engagement therewith of outer flange 25 on each bracket. A center line between the respective brackets 23 is next obtained and the distance between such center line and the outer leg of each bracket established. This distance is obtained for use in assembling the upper ram brackets 17 on the box 3 of the truck, as will be described.

In assembling the parts of the invention on box 3 the frame 5 braced by cross members 6 and including cross members 7 and 15 are welded to the bottom and sides of the box and inset within any interfering cross members. Next a center line is established on cross members 7 and 15. The upper ram brackets 17 are then welded to cross member 15 at a location thereon where the distance between the center line on member 15 and the outer leg of each bracket is equal to the distance between the center line and the outer leg of the lower ram brackets 23. When thus welded in place the brackets 17 will be properly aligned with the lower ram brackets 23.

To assemble the hinge bracket 8 on the box 3 the distance between a center line through the longitudinal center of the truck chassis and a center line through each channel of frame 2 is first established. The brackets 8 are then welded to the rear cross member 7 at locations where the distance between center lines through each bracket 8 and through member 7 corresponds to the distance between the center line of the truck chassis and that of each channel of frame 2.

In the next operation the box 3 is assembled over the frame 2 until the hinge brackets 8 are lowered over frame 2 so that the hinge pin 11 can be inserted through aligned holes in the legs of each bracket 8 and in block 10 previously secured to frame 2. The assembly is completed by inserting the upper end 18 of the piston of the rams 4 inside upper ram brackets 17 and pivoting them together by insertion of hinge pin 20 therethrough.

Under the embodiment of the invention, illustrated in Figs. 10, 11 and 12 there is shown a somewhat different support for the rams at the lower end. The channel 21 in this embodiment has angle irons 35 welded thereto which correspond to the angle irons 22 shown in Fig. 9. Shims 26 are eliminated and each bracket 23 with its horizontal upper portion 24 is supplanted by a bracket 36 which is welded to channel 21. The shape of brackets 36 is similar to that of brackets 23 and they are also provided with seats or projections 27 to which the tubes 29 are welded as in the embodiment of Fig. 9.

The blocks 37 in Figs. 13, 14 and 15 in this embodiment take the place of block 10 and shim 14 of the box hinge structure as is illustrated in Fig. 8.

Under the invention tubes 29 take the front and back thrusts of the dump body in service while member 21 takes the up and down thrust and prevents the brackets 23 from moving sidewardly.

The assembly of the parts described merely illustrates one method of assembly. In the platform type of truck construction, for example, the assembly would be different but the standard parts described would be employed.

The two rams are disposed with relation to the propeller shaft of the truck so that the propeller shaft is free for vertical movement in service without interference from the rams. The height of the floor of the box of the truck is thus dictated only by requirements for strength in the frame under the box or by normal clearance of rivet heads and the like on the frame. The floor of the box can be maintained at the minimum height desirable for loading purposes and greater leverage by the rams can be obtained.

Also the box frame comprising longitudinal members 5 and cross members 6 is located with respect to the vertical wall of the box to borrow strength and rigidity from the box side wall to strengthen the assembly for lifting a load and permit use of a lighter frame on the box. The box acts as a stiffening member for the frame because the frame is secured close to the side wall of the box.

The rear hinges which straddle the frame are strengthened by the frame as the frame supports the hinges against side thrust and support the hinges at a low hinge line to provide greater leverage.

In trucks of one and one-half tons and over frames are standard size in width and the top of frames are flat. However, in trucks of one ton and below, frames in different makes of trucks are of varying width and many of the frames are humped. The invention provides standardized parts for fabricating relatively small trucks of this type into dump trucks.

The invention provides standard parts for either converting a pick-up truck to a dump truck or assembling a dump box on a chassis which parts are adjustable by use of shims to take care of height differences in different truck frames and disposed to be located at different transverse positions for assembly with truck frames of different widths. The brace tubes employed are also applicable to many different makes and models of trucks. The parts of the invention are also provided in a dump body assembly to maintain the box at a minimum height. By employing standard parts costs are kept at a minimum, and the fabrication of a dump truck accomplished without requiring unusually skilled workmen.

Various embodiments of the invention may be employed within the scope of the accompanying claims.

I claim:

1. In an assembly of standardized parts for fabricating dump trucks of various makes wherein the box of each truck is pivoted from the frame by hydraulic rams or the like, a rear hinge construction for said box which comprises a box shaped hollow cross member secured to the bottom of the box adjacent the rear end thereof, a hinge bracket welded to said cross member and having depending flanged legs projecting downwardly therefrom on either side of said frame, a block member having a depending section to receive a pivot pin extending transversely therethrough and through the legs of said hinge bracket for hinging the parts together and an overhanging upper section to receive upwardly projecting bolts to secure the same to the frame, and shim means to be disposed between the block member and frame for adapting the hinge to the thickness of the frame.

2. In an assembly of standardized parts for fabricating dump trucks of various makes wherein the box of each truck is pivoted from the frame by hydraulic rams or the like, a rear hinge construction for said box which comprises a square shaped hollow cross member secured to the bottom of the box adjacent the rear end thereof, a hinge bracket welded to said cross member and having depending flanged legs projecting downwardly therefrom on either side of said frame, a block member having a depending section to receive a pivot pin extending transversely therethrough and through the legs of said hinge bracket for hinging the parts together and an overhanging upper section to receive upwardly projecting bolts to secure the same to the frame, shim means adapted to be disposed between the block member and frame for adapting the hinge to the thickness, and an angularly shaped member secured to the frame within each hinge bracket and receiving the upwardly projecting bolts extending through said block to reinforce and brace the hinge assembly and the truck frame.

3. In an assembly of standardized parts for fabricating dump trucks of various makes wherein the box of each truck is tilted from the frame by hydraulic rams or the like and is pivoted to the rear of the frame, a pair of transversely spaced upper ram brackets secured to the bottom of the box forwardly of said hinge members and disposed to receive the upper ends of said rams, a pair of transversely spaced lower ram brackets supported forwardly of said upper ram brackets on said frame and disposed to index the transverse position of each bracket relative to the frame and to receive the lower ends of said rams, a hemispherical shaped projection provided on the forward side of said brackets, and a tube extending between each bracket and frame to take the thrust of the rams when the box is tilted, the forward end of each tube being flat to secure the same to the frame and the rear end of the tube seating on the rivet head in a plurality of different positions for welding thereto.

4. In an assembly of standardized parts for fabricating dump trucks of various makes wherein the box of each truck is tilted from the frame by hydraulic rams or the like and is pivoted to the rear of the frame, and in which the frame has a cross member forwardly thereof, a pair of transversely spaced upper ram brackets secured to the bottom of the box forwardly of said hinge members and disposed to receive the upper ends of the pistons of said rams, a pair of transversely spaced lower ram brackets supported forwardly of said upper ram brackets on said frame and disposed to index the transverse position of each bracket relative to the frame and to receive the lower ends of said rams, a hemispherical projection provided on the forward side of said brackets, and a tube extending between each lower ram bracket and said forward frame cross member, the forward end of each tube being flat and disposed for securing the same to the underside of the cross member and the rear end of the tube seating on said projection of the bracket in a plurality of different positions for welding thereto.

5. Standardized parts for fabricating dump trucks of various makes wherein the box of the truck is tilted from the truck frame by hydraulic rams or the like, which comprises a pair of transversely spaced hinge members secured at their upper ends to the bottom of said box and pivoted at their lower ends to the frame of the truck, a pair of transversely spaced upper ram brackets secured to the bottom of the box forwardly of said hinge members and disposed to receive the upper ends of said rams, a cross member secured to said frame forwardly of said upper ram brackets, the distance between said cross member and said ram brackets being the greater part of the length of said rams, a pair of transversely spaced lower ram brackets depending downwardly from said cross member and disposed to index the transverse position of each bracket relative to the frame and to receive the lower ends of said rams, the rams being disposed at all times above the level of the bottoms of said lower ram brackets, and means extending forwardly between each lower ram bracket and the truck frame to brace said lower ram brackets against the frame to take the thrust of the rams when the box is raised and pivoted on said hinge members.

6. The combination according to claim 5, said bracing means comprising tube members, said tube members being provided of a length for cutting to fit various makes and models of trucks.

7. The combination according to claim 5, further provided with a hollow metal cross member secured to the box of the truck adjacent the rear of said box, said hinge members comprising a pair of transversely spaced box hinge brackets secured to said last-mentioned cross member and overhanging the frame of the truck, and means to pivot said hinge brackets to the frame and to hinge the box to the frame for pivoting thereon.

8. In a dump truck comprising a pair of longitudinally extending channel-shaped members transversely spaced from each other, a box disposed above said frame members, hinge means pivoting the box to the rear portion of said frame members, hydraulic rams for pivoting said box, means on the bottom of said box to pivot the upper ends of said rams thereto, an angularly shaped cross member secured to the tops of said frame members forwardly of said ram pivoting means, said cross member overhanging said frame on both sides, a pair of transversely spaced L-shaped ram brackets, said brackets each having an elongated body section in underlying engagement with said cross member, an outer flange at the end of said elongated body section and abutting the web of its corresponding frame member, a depending leg section on each of said brackets, the spacing of each leg section from its adjacent frame member being determined by the length of said elongated body section, and means for pivoting the lower ends of said hydraulic rams to said depending legs.

9. The combination according to claim 8, further provided with angle irons bolted between said frame members and the overhanging portions of said cross member, and means for bolting said L-shaped ram brackets to said cross member and said frame members, the outer flanges of said elongated body sections also being bolted to said angle irons.

ELMER O. DALE.

References Cited in the file of this patent

UNITED STATES PATENTS

| Number | Name | Date |
|---|---|---|
| 1,328,890 | Omen | Jan. 27, 1920 |
| 1,536,959 | Martin | May 5, 1925 |
| 1,904,922 | Jungersen | Apr. 18, 1933 |
| 2,004,744 | Ballert | June 11, 1935 |
| 2,037,999 | Ochsner | Apr. 21, 1936 |
| 2,142,089 | Barrett | Jan. 3, 1939 |
| 2,162,831 | Barrett | June 20, 1939 |
| 2,189,052 | Anthony | Feb. 6, 1940 |
| 2,332,961 | Wood | Oct. 26, 1943 |
| 2,358,224 | Golay | Sept. 12, 1944 |
| 2,454,481 | Rumsby | Nov. 23, 1948 |

FOREIGN PATENTS

| Number | Country | Date |
|---|---|---|
| 159,820 | Switzerland | Apr. 1, 1933 |
| 773,151 | France | Aug. 12, 1934 |